Aug. 17, 1965

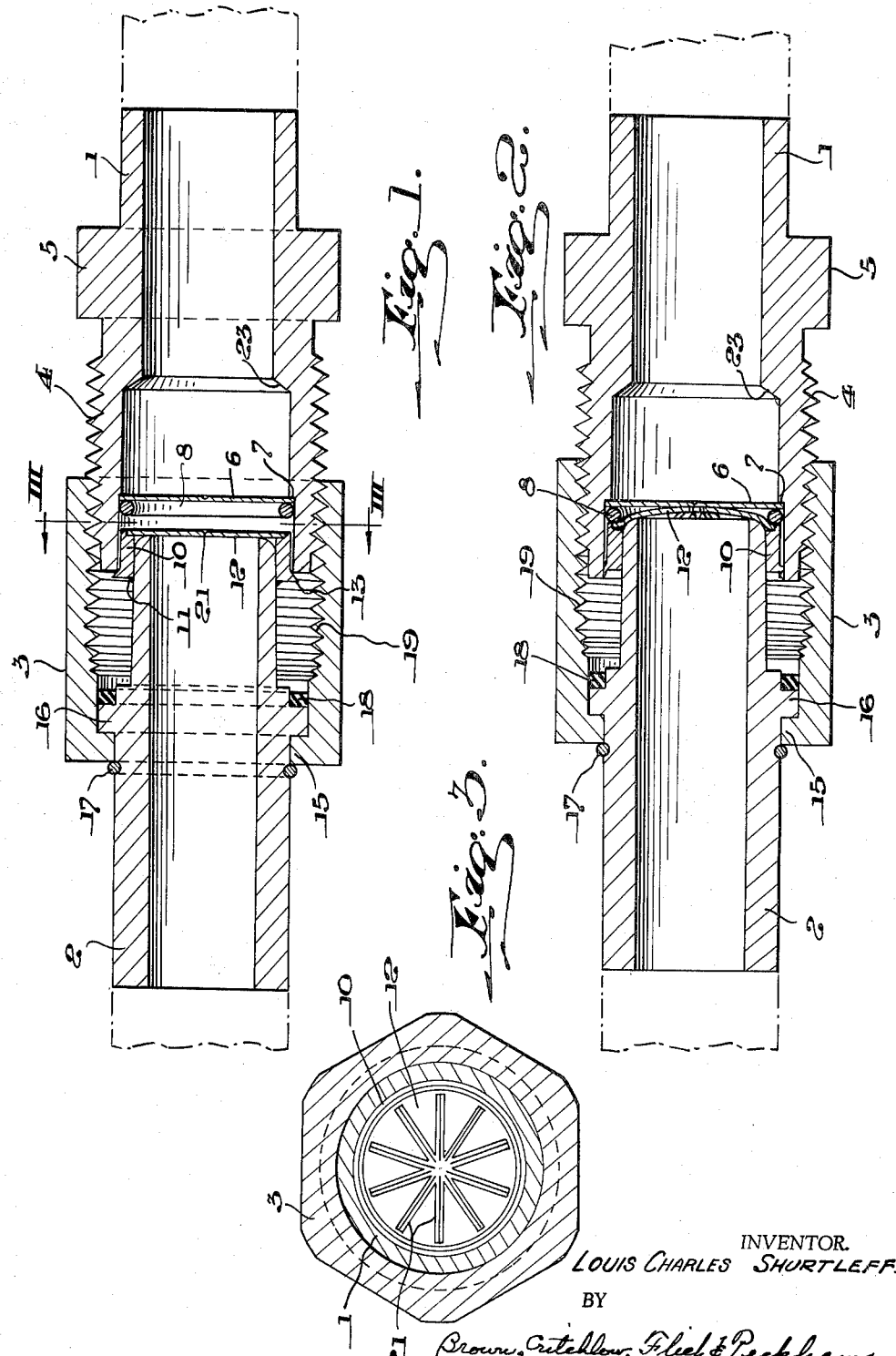

L. C. SHURTLEFF 3,201,148

COUPLING MEANS FOR CONNECTING CONDUITS

Filed May 16, 1963

INVENTOR.
LOUIS CHARLES SHURTLEFF.
BY
Brown, Critchlow, Flick & Peckham
ATTORNEYS.

United States Patent Office 3,201,148
Patented Aug. 17, 1965

3,201,148
COUPLING MEANS FOR CONNECTING CONDUITS
Louis Charles Shurtleff, Austin, Tex., assignor to Chatleff Controls, Inc., Austin, Tex., a corporation of Texas
Filed May 16, 1963, Ser. No. 280,866
6 Claims. (Cl. 285—3)

This invention relates to conduit couplings, and more particularly to coupling means that automatically rupture seals for the conduits when the conduits are connected.

It is sometimes desirable to connect conduits that are sealed to hold fluid in them or to prevent the entrance of unwanted fluid. One way of making such a connection has been to provide the adjoining ends of the conduits with fittings that can be screwed together and that contain means for piercing the conduit seals as the connection is made. In the past the seals have been pierced or cut by punches or knives that partially obstruct the fluid passage and which leave parts of the sealing members in it where they may further obstruct the passage or even break loose and travel through it.

It is among the objects of this invention to provide coupling means which are simple and inexpensive in construction, which automatically rupture the conduit seals when the connection is made, which prevent escape or entrance of fluid while the connection is being made and accomplish it without the usual flexible seals, which do not require a separate punch or knife, which remove the ruptured seals from the flow path, and which leave a smooth flow passage through the coupling.

In accordance with this invention, an externally threaded first tubular fitting has a rear end that can be attached to one end of a conduit. A thin metal disc is disposed in the front end portion of the fitting and is permanently secured to it a short distance from that end to seal the fitting against passage of fluid through it. A second tubular fitting likewise has a rear end for attachment to one of another conduit, and it has a free front end portion that is insertable in the front end portion of the first fitting in radially spaced relation with it. The front end of the second fitting is encircled and tightly engaged by a sleeve that is secured to the fitting by a rupturable joint. The sleeve also is small enough to enter the front end of the first fitting. A thin metal disc extends across the front end of the second fitting and is permanently secured to the sleeve to seal that fitting against passage of fluid through it. For best results, the sealing discs are provided with lines of weakness so that they can be broken in a predetermined pattern. Rotatably mounted on the second fitting is a coupling nut, which is provided with internal threads so that it can be screwed onto the first fitting to draw the two fittings together in telescoping relation. The first fitting includes means for limiting the distance the sleeve can move into it. After the sleeve has been stopped by such means, the rupturable joint connecting the sleeve to the second fitting will be broken by the forwardly moving second fitting sliding forward in the sleeve. The discs then will be ruptured or torn apart by the pressure of the front end of the second fitting moving forward relative to the edges of the discs. The lines of weakness, with which the discs are provided, preferably radiate from the centers of the discs so that they will break or tear into triangular segments that the telescoping fittings will bend outward into the annular space between the telescoped portions of the two fittings.

The invention is illustrated in the accompanying drawings, in which

FIG. 1 is a longitudinal section through the coupling after the two fittings have been brought together but before any metal has been displaced;

FIG. 2 is a similar view, but showing the fittings drawn farther together so that one sealing disc has been ruptured;

FIG. 3 is a cross section taken on the line III—III of FIG. 1;

Figure 4:
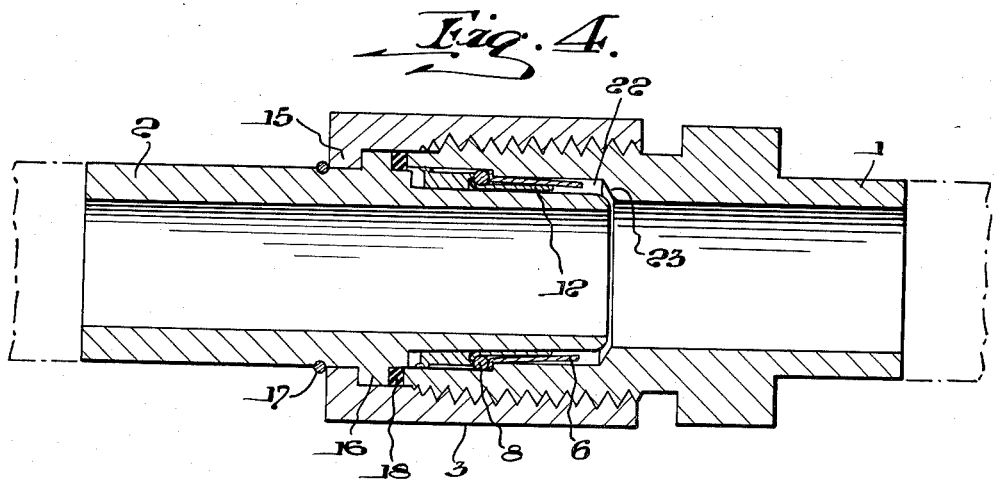
FIG. 4 is a longitudinal section showing the fittings completely coupled.

Referring to FIGS. 1 and 3 of the drawings, two fittings 1 and 2 are shown held in axial alignment by a coupling nut 3. The first fitting 1 has a rear end that is adapted to be attached in any suitable manner to a conduit of any kind, such as a fixed conduit or a flexible tube. The opposite or front end portion of the fitting is provided with external screw threads 4, behind which the fitting has flat portions 5 for receiving a wrench. A thin metal sealing disc 6 is permanently mounted in the front end portion of the fitting a short distance from its front end. The edge of the disc is soldered or welded to the encircling fitting. Preferably, the marginal portion of the disc is backed up by an annular shoulder 7 formed in the fitting. It also is desirable, although not necessary, to place a metal spacing ring 8 in engagement with the front of the disc in order to make the coupling operation easier.

The rear end of the other or second fitting 2 likewise is formed for attachment to a fluid conduit, but its front end portion is small enough to enter the front end portion of the first fitting and be spaced inwardly therefrom, and long enough to extend a considerable distance past shoulder 7. Encircling the front end of the second fitting is a short metal sleeve 10 that tightly engages the fitting. This sleeve is small enough to be inserted in the first fitting in front of spacing ring 8, but too large to pass through that ring. The sleeve is rigidly connected to the second fitting by solder or the like, which forms a joint 11 that can be broken by application of a predetermined axial pressure to the sleeve. Permanently secured to the front end of the sleeve is the periphery of a thin metal disc 12 that extends across the front end of the second fitting to seal the latter against passage of fluid through it. Joint 11 must be strong enough to prevent fluid pressure inside the fitting from rupturing the joint and blowing off the sleeve and sealing disc. The sleeve is provided with an integral encircling thin lip 13, preferably at its rear end, which has an outer diameter slidably greater than the inner diameter of the front end of the first fitting. Preferably, the front face of the lip is tapered forward. The purpose of this lip will be described presently.

The coupling nut 3 is rotatably mounted on second fitting 2 and is provided at its rear end with an inwardly projecting flange 15 that is held against the back side of a flange 16 on the fitting by means of a snap ring 17 in a groove in the fitting. Engaging the front side of fitting flange 16 is a sealing gasket 18. The inside of the nut is provided with threads 19 so that the nut can be screwed onto the first fitting.

Assuming that the two fittings 1 and 2 have been attached to conduits charged with fluid under pressure and that it is desired to connect the two conduits so that the fluid can flow from one to the other of them, the two fittings are brought into axial alignment as shown in FIG. 1 and the nut 3 is screwed onto the first fitting to draw the front end of the second fitting and the encircling sleeve 10 into the front end of the first fitting. Before the two fittings can be telescoped far enough for the sleeve to be stopped by spacing ring 8, lip 13 on the sleeve engages the inner edge of the front end of the first fitting as shown. Now greater force is applied to turning the nut, with the result that the lip is deformed by the first fitting and the lip slides into it in tight engagement with its inner surface as shown in FIG. 2, so that there can be no leakage between them. The tight frictional fit between the lip and encircling fitting also prevents the first fitting from turning with the nut and possibly twisting off the conduit, to which that fitting is attached.

When the forward movement of the sleeve is stopped by engagement of it or disc 12 with the spacing ring, continued turning of the nut will exert so much axial pressure on the sleeve and flange 16 toward each other that the joint 11 between the flange and fitting 2 will be broken and the fitting thereafter will slide forward through the sleeve. "Forward movement" of the fitting is spoken of for convenience but it will be understood that the fitting 2 could be stationary and fitting 1 telescoped over it. When the front end of fitting 2 begins to move forward out of the sleeve, it exerts great pressure against the adjoining disc and ruptures it as shown in FIG. 2. When spacing ring 8 is used as just described, only disc 12 is ruptured at this time because of the space between the two discs. This makes the rupturing operation easier than if both discs had to be broken at the same time. Rupturing is assisted and controlled by providing disc 12 with lines of weakness. These lines most suitably radiate outward from the center of the disc and may be formed by grooves 21 in the disc as shown in FIG. 3. With this pattern, the disc will tear outward along the grooves to from triangular segments. The rounded outer edge of the front end of fitting 2 will prevent that fitting from cutting the disc.

To prevent the posibility of coupling nut 3, through its frictional engagement with flange 16, turning fitting 2 and twisting the conduit connected to it, the engagement between that fitting and sleeve 10 is made extremely tight by tapering the front portion of the fitting forward slightly so that as it is moved ahead by the nut it will become more and more tightly wedged in the sleeve. Therefore, when the first fitting 1 is held stationary, the only rotating member will be the nut. This tight connection also prevents any possibility of leakage between the sleeve and fitting 2.

After the first disc 12 has been broken, the forwardly moving second fitting 2 will exert similar pressure through broken disc 12 against the other sealing disc 6, which is formed in the same way, and will rupture that one into triangular segments also. Continued turning of the coupling nut will cause the two fittings to telescope further together until the triangular segments of the two discs have been bent out into the annular space 22 between the two fittings beyond shoulder 7 as shown in FIG. 4, whereby the disc segments are removed completely from the flow passage through the coupling. The nut is tightened until the front end of fitting 1 presses tightly against sealing gasket 18 to complete the sealing of the coupling. It also is desirable to close space 22 so that there will be no possibility of any disc fragments escaping from it into the flow passage. This closing can be done by reducing the diameter of the rear portion of the passage through the first fitting 1 in order to provide an inside annular shoulder 23 that is located close to the front end of the other fitting when the two fittings are fully telescoped. The two fittings should not come together at this point because that might prevent fitting 1 from engaging the sealing gasket tightly enough. On the other hand, if desired, the sealing gasket could be located between shoulder 23 and the adjacent front end of the other fitting. It will be seen from FIG. 4 that the sealing discs are as completely removed from the flow passage as if they did not exist, and that the passage through the coupling is completely open and free of all obstructions.

Figures 5, 6:
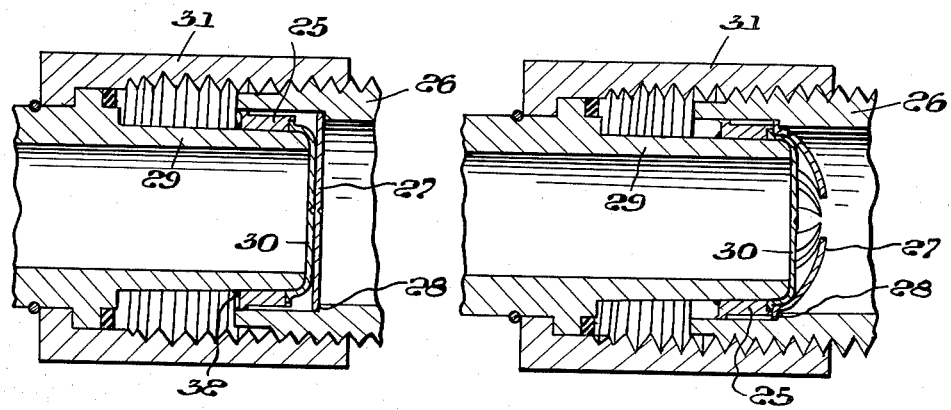
FIGS. 5 and 6 are fragmentary longitudinal sections of a modification, showing the relative positions of the parts at two different stages in the coupling operation.

In the modification shown in FIGS. 5 and 6, although the spacing ring 8 of the first embodiment has been omitted so that the forward movement of the sleeve 25 into the first tubular fitting 26 is arrested by the latter's sealing disc 27 and the fitting shoulder 28 backing it up, the second tubular fitting 29 is prevented from having to break its sealing disc 30 simultaneously with disc 27 as the two fittings are telescoped by coupling nut 31. This is done by locating the sleeve 25 a short distance rearwardly from the front end of fitting 29 so that the marginal area of sealing disc 30 therefore has to extend back around the front end of that fitting to the sleeve, to which it is permanently attached. As a result, as shown in FIG. 5, the two sealing discs first will come together while the sleeve is still spaced from disc 27. Then, as shown in FIG. 6, the pressure of the front end of fitting 29 through disc 30 against disc 27 adjacent shoulder 28 will rupture disc 27. After that has occurred, the sleeve will be stopped by the marginal portion of the ruptured disc, and continued forward movement of second fitting 29 will break the joint 32 between it and the sleeve so that the fitting can exert enough pressure against the adjoining disc 30 to rupture it. Telescoping of the two fittings is continued until they are in the relative positions shown in FIG. 4, in which the disc segments will be bent out into the annular chamber between the two fittings.

I claim:

1. Coupling means for connecting conduits, comprising an externally threaded first tubular fitting having a rear end for attachment to one end of a conduit and having a free front end, a thin metal disc inside the front end portion of said fitting and permanently secured thereto in a location spaced from said front end to seal the fitting against passage of fluid therethrough, a second tubular fitting having a rear end for attachment to one end of another conduit and having a free front end portion insertable in the front end portion of the first fitting in radially spaced relation therewith, said disc being larger in diameter than the front end of the second fitting, a sleeve encircling the outside of the front end of said second fitting and tightly engaging it, rupturable means forming a joint between the sleeve and second fitting, the sleeve being of a diameter small enough to enter the front end of the first fitting, a thin metal disc extending across the front end of the second fitting and permanently secured to the sleeve to seal the second fitting against passage of fluid therethrough, a coupling nut rotatably mounted on the second fitting and provided with internal threads for screwing it onto the first fitting to draw the two fittings toward each other in telescoping relation, and means in the first fitting outside the path of movement of the second fitting for limiting the distance said sleeve can move into the first fitting, said rupturable joint being breakable by the forwardly moving second fitting sliding forward in the sleeve after the sleeve has been stopped by said limiting means, said discs being weak enough to be ruptured by the pressure of the front end of the second fitting moving forward relative to the edges of the discs, the inside of the first fitting directly behind said first-mentioned disc being large enough to receive the front end portion of the second fitting after the discs have been ruptured.

2. Coupling means according to claim 1, in which said limiting means includes an annular shoulder integral with said first fitting and engaging the back of the disc therein, the inner diameter of said shoulder being enough greater than the outer diameter of the front end portion of said second fitting to receive the latter and also the ruptured discs.

3. Coupling means according to claim 1, in which said limiting means includes a ring fitting in said first fitting in front of the disc therein and serving to stop said sleeve before the two discs meet, the inner diameter of the ring being great enough to receive the front end portion of said second fitting and also the second-mentioned disc after it has been ruptured.

4. Coupling means according to claim 1, in which said sleeve is provided with an integral encircling thin lip having an outer diameter greater than the inner diameter of the front end of said first fitting, said lip being deformable by said first fitting as the fittings are drawn together by said nut, whereby the lip will enter the first fitting and tightly engage its inner surface.

5. Coupling means according to claim 1, in which said sleeve is spaced from the front end of said second fitting so that the latter will rupture the disc secured to the first fitting before rupturing the other disc.

6. Coupling means according to claim 1, in which said front end of the second tubular fitting is tapered forward for wedging itself in the sleeve as that fitting slides forward in the sleeve.

References Cited by the Examiner

UNITED STATES PATENTS

| | | | |
|---|---|---|---|
| 1,933,117 | 10/33 | Markle | 285—3 |
| 2,933,333 | 4/60 | Bredtschneider | 285—3 |
| 2,958,545 | 11/60 | Stelzer | 285—3 |

CARL W. TOMLIN, *Primary Examiner.*